(Model.)

H. G. SWOPE.
SEEDING MACHINE.

No. 264,908. Patented Sept. 26, 1882.

Attest.
Inventor.
Horace G. Swope
by Stem & Peck his Atty

N. PETERS, Photo-Lithographer, Washington, D. C.

UNITED STATES PATENT OFFICE.

HORACE G. SWOPE, OF LIBERTY, INDIANA, ASSIGNOR OF ONE-HALF TO SQUIRE B. RUDE, GEORGE W. RUDE, AND JOHN R. RUDE, OF SAME PLACE.

SEEDING-MACHINE.

SPECIFICATION forming part of Letters Patent No. 264,908, dated September 26, 1882.

Application filed September 27, 1881. (Model.)

*To all whom it may concern:*

Be it known that I, HORACE G. SWOPE, a citizen of the United States, residing at Liberty, Union county, Indiana, have invented certain new and useful Improvements in Broadcast-Seeding Machines, of which the following is a specification.

My invention relates to an improvement in broadcast-seeding machines. These machines as ordinarily constructed are provided with cultivating-shovels attached to drag-bars and traveling in the rear of the seed-dropping mechanism, so as to turn up or furrow the ground in rear of the dropped seed. Means are usually employed to raise the shovels out of the ground by elevating their drag-bars, and this elevation of the drag-bars throws the seeding mechanism out of gear, so that when the drags are raised the seed mechanism must necessarily stop. From this description it will be seen that there are only two positions of the drag-bars—an elevated one, which stops the seeding of the machine, and a lowered one with the shovels in the ground, which puts the seed mechanism in motion. In the West and Northwest, and chiefly in the spring of the year, it is frequently desirable in bad places, called "sloughs," and in unfavorable conditions of the soil, to use the seeding mechanism and at the same time have the shovels raised out of the ground.

The object of this invention is to provide a machine of the class designated which can be used with the drag-bars lowered and with the shovels in the ground and with the seeding mechanism in operation, and also with the drag-bars raised, so as to lift the shovels out of the ground and still leave the seeding mechanism in operation, while, again, by further raising the drag-bars, the seeding mechanism will be stopped, and to accomplish these changes simply, speedily, and without stopping the progressive motion of the machine.

The novelty consists in the construction and combinations of parts, which I will first describe, and then point out particularly in the claims.

Figure 1:
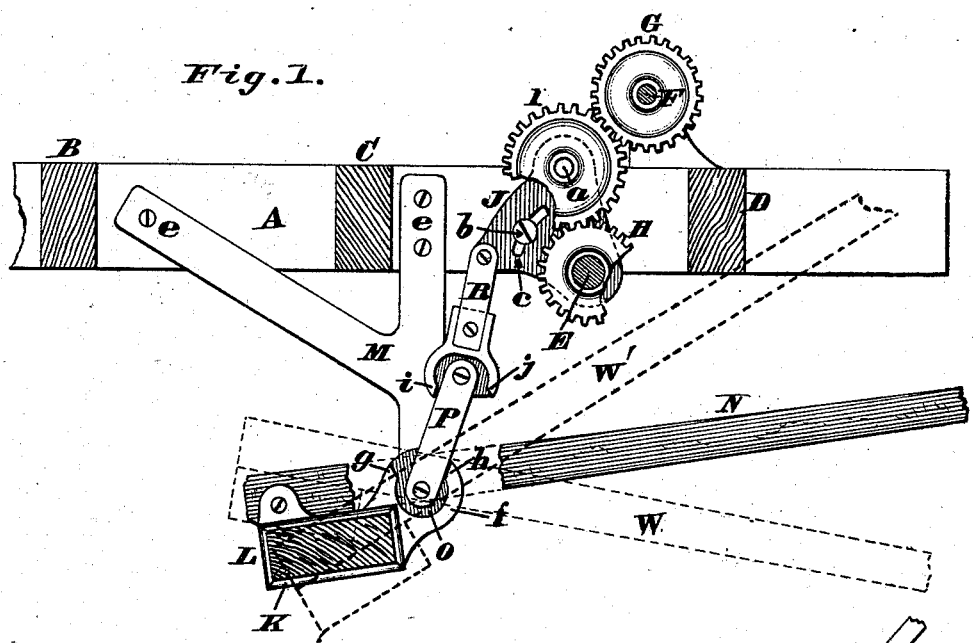
Figure 2:
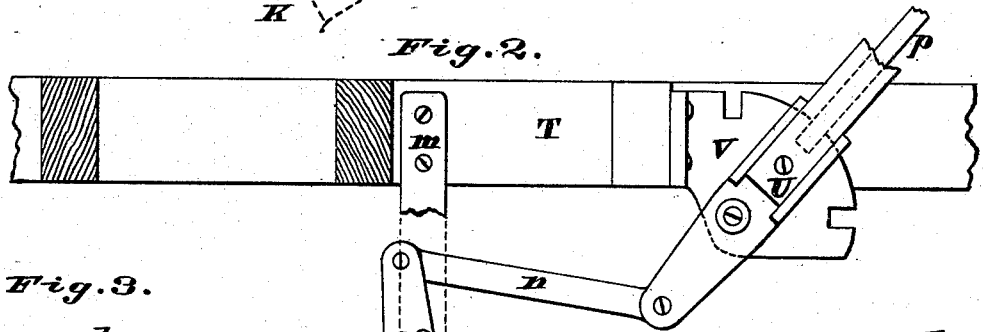
Figure 3:
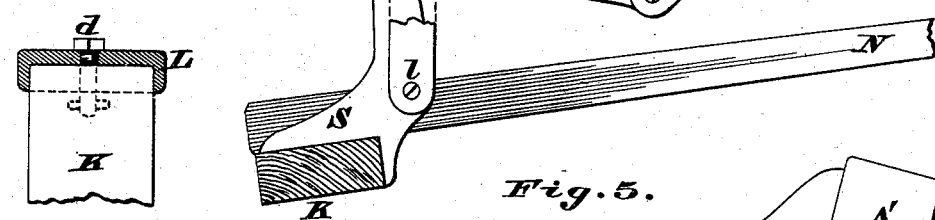
Figure 4:
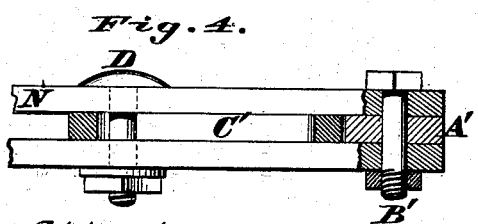
Figure 5:
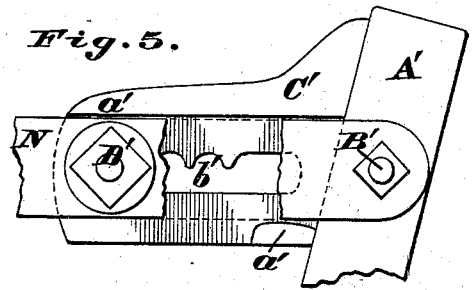

In the accompanying drawings, Figure 1 is a longitudinal sectional view through the frame-work of my improved machine with so much of the mechanism attached as illustrates my invention. Fig. 2 is a corresponding view through the middle of the frame. Fig. 3 is a detail view to be referred to specifically hereinafter. Fig. 4 is a plan view, partly in section, through the rear of one of the drag-bars, showing an improved shovel-standard attachment. Fig. 5 is a side elevation, partly in section, of Fig. 4.

The same letters indicate like parts in all the figures.

A, Fig. 1, represents the side beam of the frame of the machine, which is constructed in the usual or any suitable manner.

B is the forward cross-beam, and C and D the middle and rear beams, respectively. E is the axle or carriage-wheel spindles, and F the feed-shaft running under or through the hopper, (not here shown, but of the usual or any suitable construction.)

Upon the feed-shaft F, at the right-hand side of the hopper, is keyed a gear-wheel, G, and upon the axle or spindle E is keyed a gear-wheel, H, which continuously revolves with the carriage-wheels of the machine.

A bell-crank or segment-plate, J, is hung upon the axle E, on which it is free to turn as a pivot, and it carries at its upper end an intermediate gear-wheel, I, which, turning loosely upon a spindle, $a$, meshes with the gear-wheels H continuously, and can be engaged with or disengaged from the wheel G. This plate is steadied and held from lateral displacement by a bolt or stud, $b$, passing through a segmental slot, $c$, into the beam A, as shown.

Extending across the machine under the middle beam, C, is an oscillating drag-rail, K, which is supported in the following manner: Upon its ends are metal socket-pieces L, Figs. 1 and 3, which are slipped over and inclose the ends of the drag-rail to prevent its splitting and to avoid cutting it. A bolt, $d$, Fig. 3, passed through the socket-piece into the end of the rail, holds the socket firmly in position.

The socket-pieces L have extensions from their rear upper corners, by means of which they are pivoted to wrought-metal straps or brackets M, whose upper ends are bolted to the side beams of the frame, as seen at e, Fig. 1. The drag-bars N, to the rear ends of which the shovel-standards are secured, as will be hereinafter explained, are suitably attached at their forward ends to the drag-rail K, so that by oscillating said rail the entire set of drag-bars is raised or lowered. The pivotal extension O of the right-hand socket-piece has a flange, f, extending nearly around it, which forms a recess open at the top between the points g and h. Pivoted in this recess by the same bolt which unites the extension O to the bracket M is a link, P, whose upper end is pivoted in a similar recess as its lower end to a second link, R, which in turn has its upper end pivoted to a corner of the bell-crank J, as seen in Fig. 1. This construction connects the bell-crank J to the drag-rail by a toggle-joint having lost motion in itself by reason of the openings between the shoulders g and h at the lower end of the link P and the shoulders i and j at its upper end. The same result may be accomplished by connecting the drag-rail to the bell-crank by means of segment-racks having lost motion by a proper spacing of their teeth or by interlocking cams.

To oscillate the rail K and raise or lower the drag-bars and their attached shovels, various means may be employed, though I prefer to use the devices shown in Fig. 2, where S is a bell-crank lever attached to the drag-rail at or near its middle, and pivoted at l to a pendent strap, m, bolted to the central longitudinal beam, T, of the frame. The upper end of this bell-crank is connected by a pivoted link, n, to a hand-lever, U, which is pivoted to a segment-rack or slotted plate, V, bolted to the frame of the machine. This lever is provided with a spring latch-dog in the manner usual in harvesters and other machines having levers which it is desirable to lock in different positions, and this locking-dog is represented by p, Fig. 2.

The operation of the mechanism described is as follows: By reference to Fig. 2 it will be observed that the lever U is inclined and locked in the middle notch of the plate V. The drag-rail is inclined, as seen in Figs. 1 and 2, and the drag-bars are raised so as to hold the shovels out of the ground. The gears G, H, and I are in mesh, so that the progressive motion of the machine drives the feed-shaft and feeding mechanism. Now, by raising the lever U and locking it in the upper notch the drag-rail will be turned so as to lower the drag-bars to the position shown by the dotted lines W, and permit the shovels to enter the ground. This shifting of the drag-rail, owing to the lost motion in the link P, will not move the bell-crank J or throw the gear I out of the mesh with the gear H, for the link P will simply travel from the shoulders h and i, and will rest against the shoulders g and j without moving the segment J; but upon shifting the lever U and locking it in a horizontal position in the lowest notch of the plate V the rail K will be so turned as to raise the drag-bars up in the position shown by the dotted lines W, which is their highest position, and this movement of the rail K will, through the medium of the links P and R, cause the bell-crank J to be drawn down and the gear I to be disengaged from the gears H, thus stopping the feeding mechanism. This shifting of the rail K and raising and lowering of the drag-bars to either of the three positions desired can be accomplished without any trouble and without stopping the machine.

Another feature of my invention is the safety attachment of the shovel-standards shown in Figs. 4 and 5.

A' is the shovel-standard, which is inserted into the slotted rear end of the drag-bar, and is pivoted therein by a bolt. This standard rests against and is held in position by a metal bearing-plate, C', which is slipped into the drag-bar slot before the standard is placed therein. The shape of the plate C' is seen in Fig. 5, and it is provided with projecting shoulders, a', which rest with slight play upon the upper and lower sides of the drag-bar. Through the web or central part of this plate is a longitudinal slot having its upper side notched or corrugated, as shown at b'. A clamping-bolt, D', passed through the drag-bar and the slot in the plate, serves to lock the plate with varying degrees of resistance. When an obstruction is met with by the shovel the upper projecting end of the standard, bearing against the upper end of the plate C', slides it back, the corrugations forming points of resistance until the shovel passes safely over the obstacle, and thus injury to the shovel and its standard would be prevented.

I am aware that seeding-machines have heretofore been made in which the drag-bars have been connected to a common oscillating drag-rail in such manner as to be all simultaneously raised or lowered when the drag-rail is oscillated; also, that it is not new in seeding-machines to so arrange the drag-bars with relation to the seed-dropping devices and an intermediate shifting mechanism that when the drag-bars are lowered to bring the shovels into contact with the ground the feed mechanism will be in operation, and when the drag-bars are raised to a certain point sufficient to raise the shovels above the ground the feed mechanism will still remain in operation, and when the drag-bars are adjusted to still another position both the shovels and the feed mechanism will be thrown out of operation; and I therefore do not claim herein either of such combinations of mechanisms, broadly.

Having thus fully described my invention, I claim—

1. In a broadcast-seeding machine, the combination, with the gear on the axle and the gear on the feed-shaft, of the intermediate gear-wheel, the oscillating bell-crank or segment, on which said intermediate gear is mounted, the oscillating drag-rail and its socket, having extension O, the toggle-levers R P, connected as described, the drag-bars and the shovels thereto connected, and the means for oscillating the drag-bar and locking it in position, whereby the feed mechanism and the shovels are rendered operative separately or together, according to the position of the drag-rail, substantially as described.

2. The combination, with the oscillating drag-rail and its socket, having extension O, of the oscillating bell-crank or segment and the toggle-levers R P, connected substantially as described.

3. The combination, with the drag-rail, of the metal socket-pieces L, embracing and protecting the ends of the rail, and having the extensions O, substantially as described.

4. The combination, with the slotted drag-bars and the shovel-standards pivoted thereto, of the sliding bearing-plate C', having flanges a' a' and longitudinal slot and corrugations b, and the clamping-bolt D', the whole arranged and adapted for operation substantially as described.

HORACE G. SWOPE.

Witnesses:
CHAS. W. WILLEY,
GEOR. W. RUDE.